United States Patent
Pizzicaroli et al.

[11] Patent Number: 5,813,634
[45] Date of Patent: Sep. 29, 1998

[54] METHOD FOR REPLACING FAILING SATELLITES IN A SATELLITE COMMUNICATION SYSTEM

[75] Inventors: Joseph Camillo Pizzicaroli, Phoenix, Ariz.; Ronald E. Glickman, Boulder, Colo.

[73] Assignee: Motorola, Inc., Schaumburg, Ill.

[21] Appl. No.: 553,790

[22] Filed: Oct. 23, 1995

[51] Int. Cl.⁶ ........................................... B64G 1/02
[52] U.S. Cl. .................... 244/176; 244/158 R; 455/12.1; 455/427
[58] Field of Search ............... 244/158 R, 176; 701/13; 455/12.1–13.3, 427–430; 342/359, 357, 368

[56] References Cited

U.S. PATENT DOCUMENTS

| | | | |
|---|---|---|---|
| 3,995,801 | 12/1976 | Bond | 244/158 |
| 5,120,007 | 6/1992 | Pocha et al. | 244/158 R |
| 5,408,237 | 4/1995 | Patterson et al. | 455/12.1 |
| 5,619,211 | 4/1997 | Horkin et al. | 342/357 |

*Primary Examiner*—Galen L. Barefoot
*Attorney, Agent, or Firm*—Gregory J. Gorrie

[57] ABSTRACT

In a constellation of orbiting satellites (12) in non-geostationary orbits, a failing satellite is replaced with a spare satellite from a spare orbit (53). The satellites (12) are in one of several orbital planes (14) that have an inclination angle with respect to the equator. An orbiting spare satellite located in a monitor orbit (55) is provided for each orbital plane (14). When a failing satellite in the operational orbit is detected, the spare satellite replaces the failing satellite by exchanging positions with the failing satellite. The failing satellite may remain in the monitor orbit to subsequently replace another failing ("sicker") satellite. Accordingly, the satellites that are the "healthiest" are maintained in operation. Cross-links (23) between satellites are maintained minimizing any disruption in communication service when a hole occurs in an orbital plane (14) as a result of a failure.

17 Claims, 4 Drawing Sheets

METHOD FOR REPLACING FAILING SATELLITES IN A SATELLITE COMMUNICATION SYSTEM

TECHNICAL FIELD OF THE INVENTION

The present invention relates generally to satellite cellular communication systems. More specifically, the present invention relates to satellite cellular communication systems having satellites in low-earth orbits that provide global coverage to substantially all of earth's surface.

BACKGROUND OF THE INVENTION

The present use of earth-orbiting satellites typically involves a single satellite placed into a specific orbit inclination and altitude to perform a particular mission. The selection of the satellite's orbit is generally dictated by its mission requirements for such parameters as coverage, resolution, lifetime, etc. The satellites may also have specific requirements which dictate more precisely its position in its orbit in relation to some other known entity in either time or space. For example, the right ascension of an ascending node is often used to specify the position of a satellite in its orbit with respect to specific earth geography at the point where the satellite's ascending ground track crosses the equator. Similarly, the orbit may be designed to have a repeating ground track with a specified periodicity, or may be required to maintain a particular relationship with respect to the sun. In all of these cases, once a satellite is placed into orbit, periodic propulsion station-keeping maneuvers are typically employed to maintain the specific orbit characteristics of the satellite in response to perturbing forces from earth, solar and lunar gravity, atmospheric drag, solar pressure, etc. Once established, fundamental orbit parameters are not typically altered other than to maintain them over time to within some pre-established accuracy.

More and more, however, constellations of satellites are being proposed and developed which distribute a mission function over a larger number of satellites dispersed over multiple orbit planes. This is particularly true for satellite missions involving global telecommunications. The orbits and relative orbital positions of satellites in these global constellations are typically very carefully chosen and maintained in order to fulfill the mission objectives. Often, the satellites are placed into specific orbital slots to maintain relative geometrical relationships between other satellites in the constellation. When satellites fail over time, holes appear in the constellation, and replacements are quickly launched from the ground in order to maintain a continuous infrastructure of satellites in support of the mission.

Over the lifetime of these constellations, advances in technology are likely to enable incremental, or even breakthrough, improvements and enhancements to the capabilities of the satellites. These enhancements may dictate that a somewhat different arrangement of satellites than originally established would be optimum. This could imply that the full benefit of the improvements would not be capable of being realized, owing to the fixed nature of the constellation geometry and the inability to reconfigure the constellation to take full advantage of the improvements. Even if the specific orbit characteristics of a particular constellation made reconfiguration feasible, the resultant disruption to ongoing service might make this option untenable. This would force constellation designers and operators to choose between continuing to operate a sub-optimum constellation or abandoning it and replacing it with an entirely new constellation at considerable expense.

Thus, what is needed are a method and apparatus for reconfiguring a constellation of satellites in a satellite communication system without disrupting service. Moreover, what is needed are a method and apparatus for adding or removing satellites in a satellite communication system. What is also needed is a method and apparatus for replacing satellites with soft failures.

DETAILED DESCRIPTION OF THE DRAWINGS

The present invention provides, among other things, a method for replacing failing satellites in a satellite communication system. In a constellation of orbiting satellites that are moving rapidly with respect to earth's surface, a failing satellite is replaced with a spare satellites from a spare orbit. The satellites are in one of several orbital planes that have an inclination angle with respect to the equator. An orbiting spare satellite located in a spare orbit is provided for each orbital plane. The spare orbit is at a lower altitude and at a slightly greater angle of inclination than the operational orbit. Because of the different angle of inclination, the spare satellite stays within the orbital plane of the operational satellites while traveling at a different orbital velocity than the operational orbit. When a failing satellite in the operational orbit is detected, the spare satellite replaces the failing satellite by exchanging positions with the failing satellite. The failing satellite may remain in a monitor orbit to subsequently replace another failing ("sicker") satellite. Accordingly, the satellites that are the "healthiest" are maintained in operation. Cross-links between satellites are maintained minimizing any disruption in communication service when a hole occurs in an orbital plane as a result of a failure.

A "satellite" is defined herein to mean a man-made object or vehicle intended to orbit earth and includes both geostationary and orbiting satellites and/or combinations thereof including low-earth orbiting (LEO) satellites (or communication stations). A "constellation" is defined herein to mean an ensemble of satellites arranged in orbits for providing specified coverage (e.g., radio communication, photogrammetry, etc.) of portion(s) or all of the earth. A constellation typically includes multiple rings (or planes) of satellites and may have equal numbers of satellites in each plane, although this is not essential. As used herein "angle of inclination" is defined to mean the angle of a satellite in a polar orbit with respect to the equator. The "health" of a satellite as used herein refers to the operational condition of a satellite and includes the quality of communication services the satellite is capable of providing. The present invention is applicable to systems including satellites having low-earth and medium-earth orbits. Additionally, it is applicable to orbits having any angle of inclination (e.g., polar, equatorial or other orbital pattern). A "soft" failure is defined herein to mean partial failure of a satellite whereas the satellite does not function completely, but is capable of providing some form of limited communications service. A "hard" failure is defined herein to mean complete failure of a satellite whereas the satellite does not provide communications service at all, but may be capable of other functions.

Figure 1:
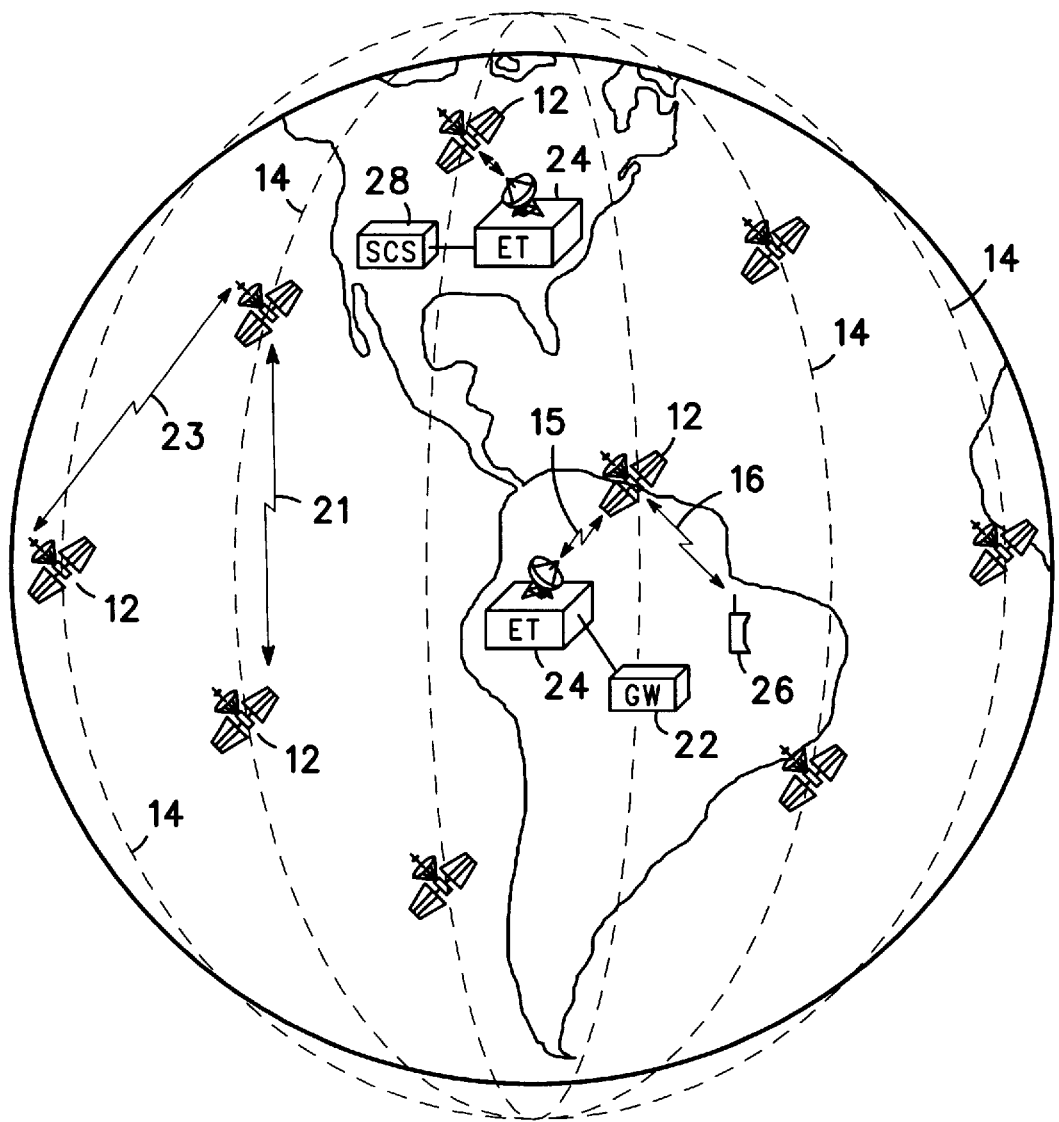
FIG. 1 illustrates a highly simplified diagram of satellite-based communication system with which the present invention may be practiced.

FIG. 1 illustrates a highly simplified diagram of satellite-based communication system 10 with which the present invention may be practiced. Communication system 10 uses six polar orbits or orbital planes 14, with each orbital plane 14 holding eleven satellite communication stations 12 for a total of sixty-six satellites 12. In the preferred embodiment, each orbit includes one spare satellite 12 located in a spare orbit. A spare may be used if an operational satellite communication station 12 fails. However, this is not essential and more or fewer satellites, or more or fewer orbits, may be used. While the present invention is advantageously employed when a large number of satellites are being used, it is also applicable to systems with only a few satellites. For clarity, FIG. 1 illustrates only a few satellite communication stations 12.

For example, each orbital plane 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units 26 and earth terminals (ETs) 24 connected to system control segment (SCS) 28. Earth terminals 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. Earth terminals 24 may be co-located with or separate from SCS 28 or GW 22. Earth terminals 24 associated with-SCSs 28 receive data describing tracking of satellites 12 and relay packets of control information while ETs 24 associated with GWs 22 only relay data packets (e.g., relating to calls in progress).

Satellites 12 communicate with other nearby satellites 12 through cross-plane cross links 23 and in-plane cross-links 21. Thus, a communication from a satellite 12 may be routed through the constellation of satellites 12 to any other satellite 12 in the constellation within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth-links 15. Earth terminals 24 are preferably distributed over the surface of the earth in accordance with geo-political boundaries. In the preferred embodiments, each satellite 12 may communicate with up to four ETs 24 and over a thousand subscriber units 26 at any given instant.

System control segments 28 monitor the health and status of system communication nodes (e.g., GWs 22, ETs 24 and satellites 12) and desirably manages operations of communication system 10. One or more ETs 24 provide the primary communications interface between SCS 28 and satellites 12. Earth terminals 24 include antennas and RF transceivers and preferably perform telemetry, tracking and control functions for the constellation of satellites 12.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
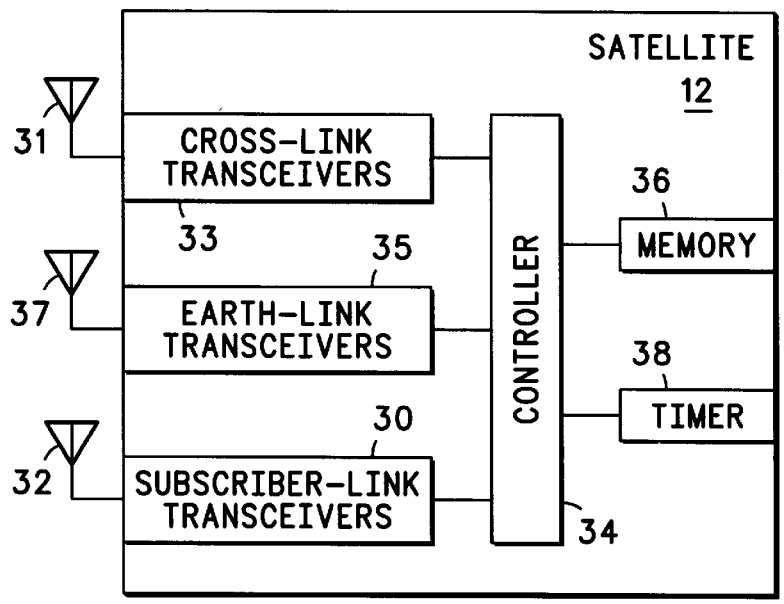
FIG. 2 illustrates a simplified block diagram of satellite communication station suitable for use in a preferred embodiment of the present invention.

FIG. 2 illustrates a simplified block diagram of satellite communication station 12 suitable for use in a preferred embodiment of the present invention. Preferably, all satellites 12 within communication system 10 (FIG. 1) include equipment as illustrated by the block diagram of FIG. 2. Satellite 12 includes cross-link transceivers 33 and associated antennas 31. Transceivers 33 and antennas 31 support cross-links to other nearby satellites 12. Earth-link transceivers 35 and associated antennas 37 support earth-links to communicate with earth terminals 24 (FIG. 1). Subscriber-link transceivers 30 and associated antennas 32 support-subscriber units 26 (FIG. 1). Of course, those skilled in the art will appreciate that antennas 31 and 37, and 32 may be implemented either as single multi-directional antennas or as banks of discrete antennas.

A controller 34 couples each of transceivers 33 and 35, and 30 as well as to a memory 36 and a timer 38. Controller 34 may be implemented using one or more processors. Controller 34 uses timer 38 to maintain, among other things, the current date and time. Memory 36 stores data that serve as instructions to controller 34 and that, when executed by controller 34, cause satellite 12 to carry out procedures which are discussed below. In addition, memory 36 includes variables, tables, and databases that are manipulated during the operation of satellite 12.

Figure 3:
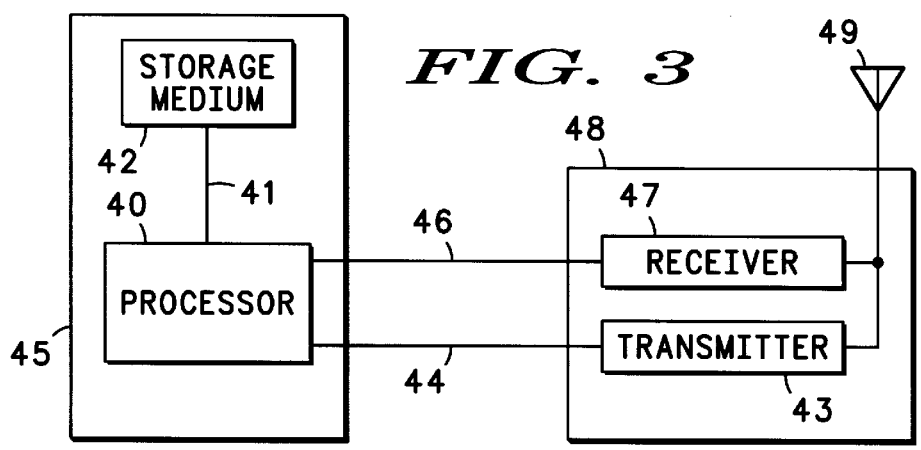
FIG. 3 illustrates a simplified block diagram of system control station and terrestrial station suitable for use in a preferred embodiment of the present invention.

FIG. 3 illustrates a simplified block diagram of system control station 45 and terrestrial station 48 suitable for use in a preferred embodiment of the present invention. Control station 45 and terrestrial station 48 are desirable part of SCS 28 (FIG. 1) and ET 24 (FIG. 1), respectively. Control station 45 comprises processor 40 coupled to associated storage medium 42 (e.g., random access memory or RAM, other semiconductor or magnetic read-write memory devices, optical disk, magnetic tape, floppy disk, hard disk etc.) via link 41. Terrestrial station 48 includes antenna 49 coupled to transmitter 43 and receiver 47. Transmitter 43 and receiver 47 are coupled to processor 40 via links 44 and 46, respectively. Processor 40 desirably carries out procedures exemplified below and described in the associated text. For example, in addition to performing other tasks as appropriate, processor 40 desirably stores results from such procedures in storage medium 42. Transmitter 43 and/or receiver 47 transmit messages to and/or receive messages from satellites. Processor 40 generally controls and manages the control functions for satellite 12.

Figure 4:
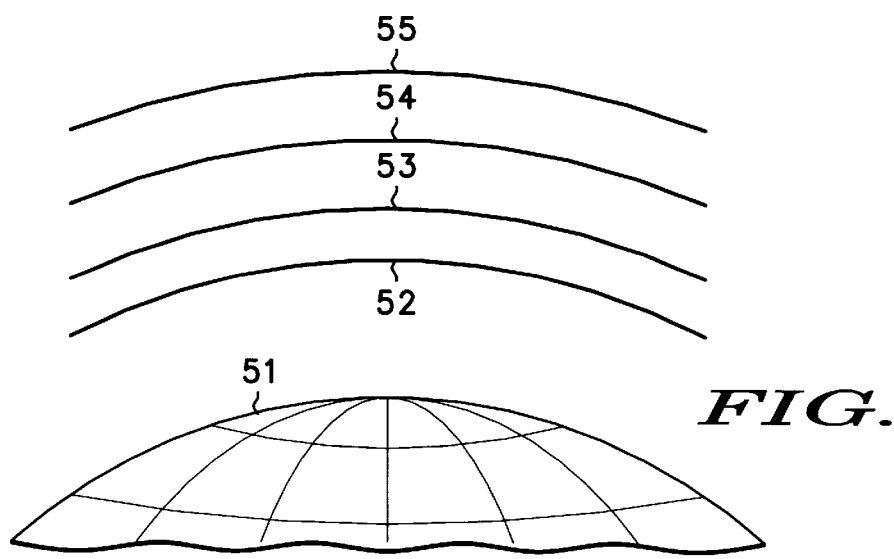
FIG. 4 illustrates a highly simplified diagram of orbital configurations suitable for a preferred embodiment of the present invention.

FIG. 4 illustrates a highly simplified diagram of orbital configurations 50 suitable for a preferred embodiment of the present invention. In the preferred embodiment, orbital configurations 50 for a constellation include six orbits (or planes) 14 (FIG. 1) of satellites. For clarity, FIG. 4 illustrates only one orbital plane 14. Orbital configuration 50 includes parking orbit 52, spare orbit 53, operational orbit 54 and monitor orbit 55. Horizon 51 is shown for reference purposes only. Maneuvering of satellites into different orbital configurations 50 is performed by a satellite in conjunction with earth-link transceivers 35 (FIG. 2) and associated antennas 37 (FIG. 2); earth terminals (ET) 24 (FIG. 1) in conjunction system control segments (SCS) 28 (FIG. 1).

Parking orbit 52 is used when single or multiple satellites are launched for installation in the network of communication stations. Typically, parking orbit 52 is the lowest orbit used within the constellation of satellites. When a satellite is launched from earth and delivered in space, the satellite is placed in parking orbit 52. A satellite maneuvers using thrusters from parking orbit 52 to spare orbit 53. In the preferred embodiment, satellites in parking orbit at a slightly greater angle of inclination that satellites in operational orbit 54. In this way, parking orbit 52 is matched with operational orbit 54.

Spare orbit 53 is used by spare (or extra) satellites until needed in operational orbit 54. Spare orbit 53 is typically a mid-orbit located above parking orbit 52 and below operational orbit 54. Satellites located in spare orbit 53 are maintained at a greater angle of inclination than satellites providing service in operational orbit 54. In this way, spare orbit 53 is matched with operational orbit 54. A satellite located in spare orbit 53 maneuvers using thrusters into position for providing service within operational orbit 54.

Operational orbit 54 is used by satellites to provide communication services for communication system 10 (FIG. 1). The angle of inclination of a satellite is rotated to match or approximate the inclination of other satellites providing service once the replacement satellite reaches operational orbit 54. In the preferred embodiment, the angle of inclination is desirably between eighty and ninety degrees with respect to the equator, and preferably about 86.4 degrees. The angle of inclination of the spare orbit is preferably about 86.59 degrees with respect to the equator.

If a satellite in operational-orbit 54 fails, a satellite in spare orbit 53 is commanded to maneuver into position replacing the failed satellite in operational orbit 54. Operational orbit 54 is typically the highest orbit used in the constellation of satellites in communication system 10 (FIG. 1) to provide communication services.

Monitor orbit 55 is preferably located slightly above operational orbit 54, but may be located slightly below operation orbit 54. Monitor orbit 55 preferably includes a monitor or spare satellite in one embodiment of the present invention. When the monitor orbit is above operational orbit 54, a satellite in monitor orbit 55 is maintained at an angle of inclination slightly less than that of the operational orbit. In this way, a satellite in monitor orbit 55 is matched with operational orbit 54.

The health status of satellites providing service in operational orbit 54 is preferably continually monitored by earth stations. A satellite located in monitor orbit 55 travels from one satellite to the next at a different speed than satellites in operational orbit 54. In one preferred embodiment, the health of the visited satellite in the operational orbit is compared with the health status of the monitor satellite. If the health of the visited satellite in operational orbit 54 is better than the satellite in monitor orbit 55, the satellite in monitor orbit 55 continues on to the next satellite in operational orbit 54. If the health of a satellite in operational orbit 54 is found to be less than that of a satellite in monitor orbit 55, that is a soft failure, the two satellites are directed to exchange places.

The exchange of places may occur in several ways. For example, a satellite in monitor orbit 55 is first instructed by earth terminal 24 (FIG. 1) and system control segment 28 (FIG. 1) to maneuver into operational orbit 54 and start providing service. The satellite in operational orbit 54 is then instructed by earth terminal 24 (FIG. 1) and system control segment 28 (FIG. 1) to maneuver into monitor orbit 55. Accordingly, a satellite with a soft failure is replaced with no service interruption.

In one preferred embodiment, satellite in monitor orbit 55 maneuvers into operational orbit 54 and starts providing service immediately after satellite in operational orbit 54 becomes inactive, thus minimizing service interruption.

In another embodiment, a satellite in operational orbit 54 stops providing service and maneuvers into monitor orbit 55. At the same time, a satellite in monitor orbit 55 maneuvers into operational orbit 54 and starts providing service as soon at it is in proper location relative to other satellites in the same operational orbit 54. Both satellites change orbits at the same time.

Exchanging a healthier satellite in monitor orbit 55 with a less healthy or sick satellite in operational orbit 54 continues until all satellites in operational orbit 54 are healthier than the monitor orbit 55 satellite. This exchange of healthy for sick satellites allows the healthiest satellites to provide service with minimal service disruption. The least healthy satellite remaining in monitor orbit 55 is continually compared to the health of satellites providing service in operational orbit 54 until replaced by a healthier satellite from spare orbit 53. When replaced, if the satellite in monitor orbit 55 has a hard failure, it may be instructed by ET 24 (FIG. 1) and SCS 28 (FIG. 1) to de-orbit and self-destruct upon reentry of earth's atmosphere.

In the preferred embodiment, since the monitor satellite is traveling at a different speed that operational satellites, when the monitor satellite approaches an operational satellite, the health of the operation satellite is compared with the health of the monitor satellite. An exchange is executed when the health of the monitor satellite is better than that of the operation satellite.

In one embodiment of the present invention, the satellite in monitor orbit 55 may be instructed by ET 24 (FIG. 1) and SCS 28 (FIG. 1) to re-locate in another orbital plane 14 (FIG. 1) and function in monitor orbit 55 by assessing the health status of other satellites as previously described. Re-location is achieved by using thrusters and/or drifting to the target orbital plane 14 (FIG. 1). Re-location to a different orbital plane 14 (FIG. 1) and comparing the health of satellites in operation orbit 54 to the satellite in the monitor orbit allows the healthiest satellites, including satellites with soft failures, to operate and maintain continuous telecommunication service. Further use of orbital configurations 50 are discussed in more detail below.

In one of the preferred embodiments of the present invention, referred to as the Mission Altitude Spare Embodiment, spare satellites are stored at mission altitude. One or more spare satellites are inserted and stored in one or more planes at the same altitude and inclination as the operational satellites in the orbital planes. The spare satellites travel at the same orbit and processional rates as the operational satellites. Starting location for a spare satellite is preferably mid-span, near one of the operational satellites, but can be somewhere else according to need. New replacement utilities are made available and advantages can be realized in connection with constellation maintenance. Original replacement capacity is also maintained. This is discussed in more detail below.

The use of mission altitude spares provides the capability to perform fast replacements, in about the same time as in the lower spare orbit embodiment. In the mission altitude spare embodiment, the spare satellite's mission altitude is either temporarily increased or decreased to modify the orbital rate. The spare satellite is then maneuvered either back up or down when approaching a failing satellite's slot. The failing satellite may be deorbited. This embodiment is advantageous in that an orbital plane can be circumnavigated in either direction which saves time and fuel. A difference in nodal period is created at the time the spare satellite is needed rather than maintaining this difference throughout the mission.

An advantage to mission spares is that less fuel is needed to offset drag that storage of spares at a lower spare orbit require. In addition, rushing from lower altitude may require higher thrust, lower efficiency (ISP) thrusters. Ascent to storage at mission altitude is done more leisurely using more efficient thrusters that save fuel. For example, it can be done ahead of time over similar or identical altitude regime. Furthermore, spare satellites are generally used to fill slots in an orbital plane only a few spans away (not all the way around the ring). This requires less fuel on average, especially when going around the ring in either direction is utilized.

One embodiment to the mission altitude spare embodiment is herein referred to as the instant replacement embodiment. This embodiment addresses the problem that satellites generally do not fail instantaneously, but rather fail with some warning. For example, a slow loss of redundant subsystems, or a reduced performance from a single string of subsystems may occur over time prior to a complete failure. In this embodiment, a spare satellite is maneuvered nearby (i.e., within a few kilometers) the failing satellite and takes up a quasi-permanent position there. This can be done slowly and at very little cost. Accordingly, the spare satellite waits for the failing satellite to fail completely, or becomes less desirable to continue its use. The spare is available for instant replacement service. It is not required that the spare satellite immediately maneuver into the old slot for turn-on since the geometry of communication pointing angles is not materially changed by a difference of a few kilometers.

When a failing satellite never fails completely, or later improves its operation condition, as is common, the spare satellite is still available for replacement of another failing satellite. Accordingly, very little is lost in terms of fuel and capability.

Once a mission altitude spare is maneuvered near a failing satellite, the failing satellite may be taken off line without interruption in services since the spare can pick up the load. Diagnostic tests and arms length repair work-arounds may be attempted to enable the failing satellite to be placed back in service. When this is successful, the spare will not have to be needlessly wasted, and the constellation is saved a very expensive replacement.

In addition, a spare positioned next to an operational satellite can be used for on-orbit experimentation without an outage. In one embodiment, a small change in altitude and inclination angle of the mission altitude spare satellite is accomplished, and the spare satellite moves around the orbital plane as a monitor satellite, as previously described.

In another embodiment of the mission altitude spare embodiment, satellites in an orbital plane are re-shuffled or rearranged. In this way, cross-links that have failed and created islands of satellites that cannot communicate with other satellites can be eliminated. Constellation connectivity is thereby improved. Outages are prevented during the re-shuffling. For example, let's say that satellites in positions three and six of an orbital plane are going to be swapped. The spare satellite picks up satellite three's load while satellite three maneuvers to satellite's six's position. Satellite three picks up satellite six's load while satellite six maneuvers to satellite three's position and picks up the spare satellite's load. The original spare can migrate somewhere else to assist in another no-outage reshuffle of assets. Little fuel is required for these maneuvers. Preferably, the constellation health is maximized.

Re-shuffling results in significant economies when the probability of anticipated future failures are considered, including consideration such as satellite age, and history. In one embodiment, an entire orbital plane of satellites is clocked with respect to an adjacent plane in a serial sequence. Accordingly, outages are prevented while the health of the constellation is improved.

Figure 5:
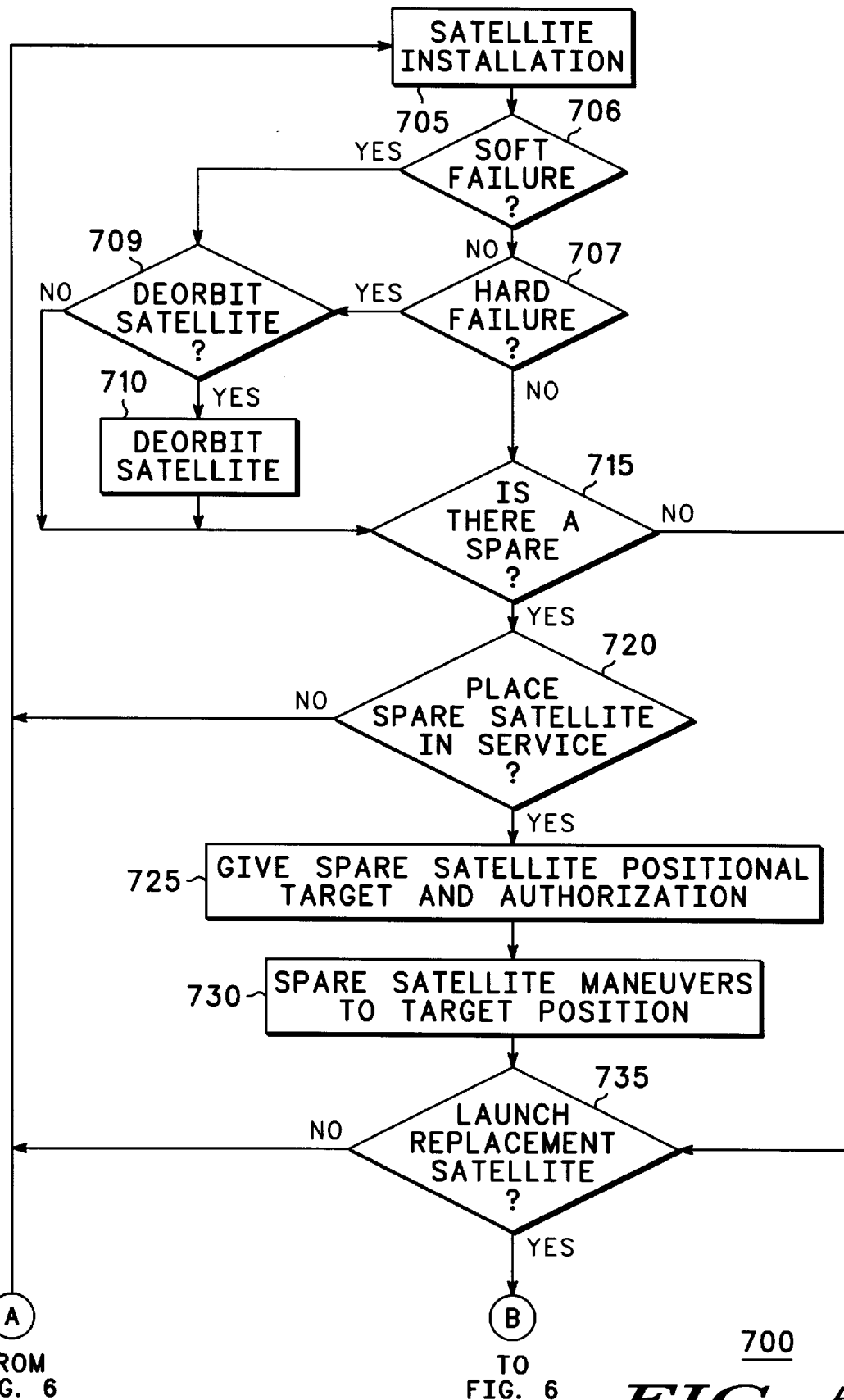
FIG. 5 and FIG. 6 illustrate a simplified procedure for placing a satellite in service suitable for use in a preferred embodiment of the present invention.
Figure 6:
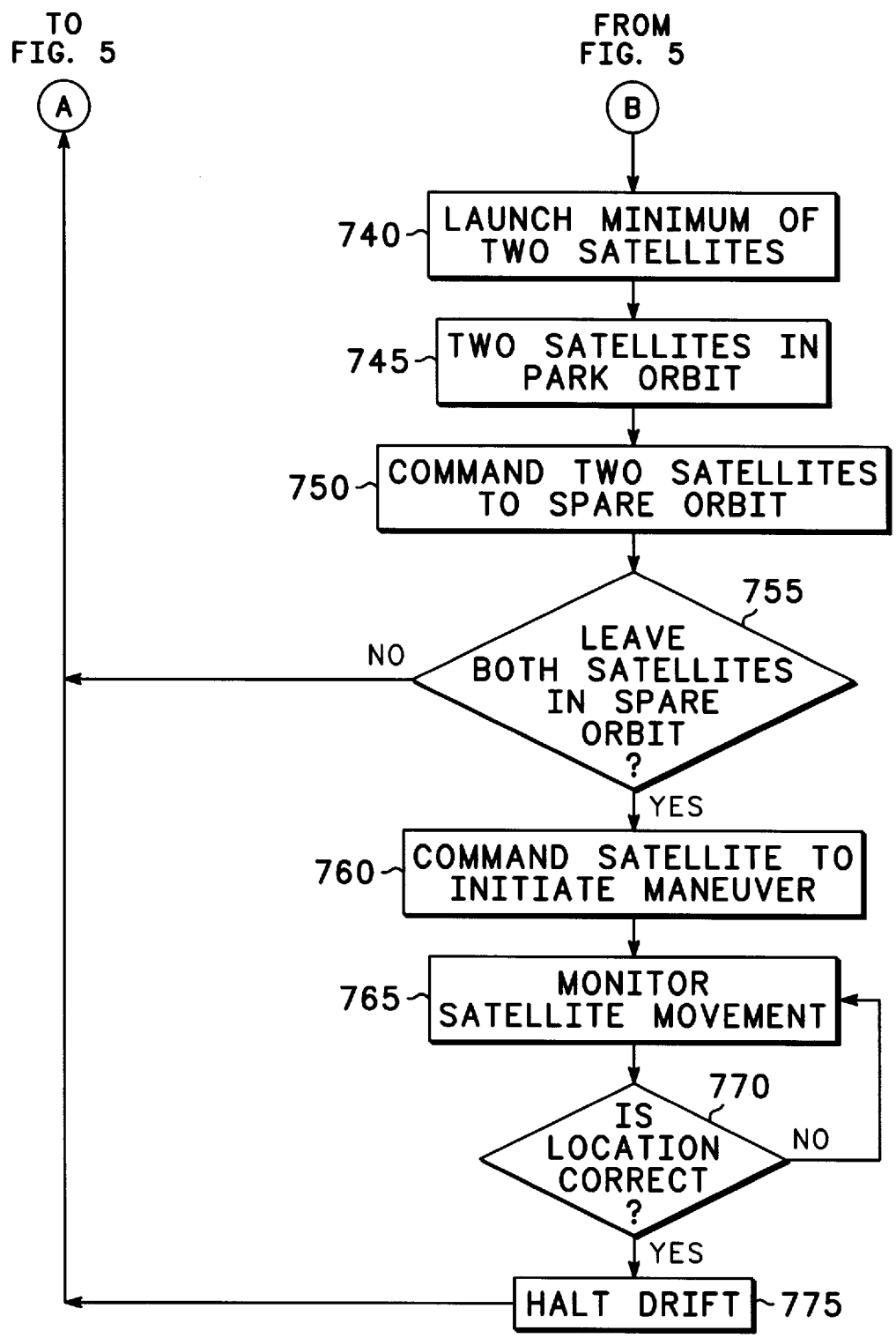

FIG. 5 and FIG. 6 illustrate a simplified procedure for placing a satellite in service suitable for use in a preferred embodiment of the present invention. In the preferred embodiment, procedure 700 is performed by satellite 12 in conjunction with earth-link transceivers 35 (FIG. 2) and associated antennas 37 (FIG. 2); earth terminals (ET) 24 (FIG. 1) in conjunction with system control segments (SCS) 28 (FIG. 1).

In the preferred embodiment, a satellite is placed in service when an operational satellite stops providing optimum service for communication system 10 (FIG. 1) or if more capability is desired. Task 705 identifies a satellite installation in communication system 10 (FIG. 1). Task 706 determines if the satellite installation is due to a soft failure. If not due to a soft failure, task 707 determines if the installation is due to a hard failure. If the installation is due to either a soft or hard failure, task 709 determines if the failed satellite is to be de-orbited.

If task 709 determines a satellite should be de-orbited, task 710 ensures the satellite de-orbits and self-destructs upon re-entry of earth's atmosphere. If task 709 determines a satellite is not to de-orbit or after task 710 ensures de-orbit is successful, task 715 determines if a spare satellite is available. A spare satellite may be located in spare orbit 53 (FIG. 4) of orbital plane 14, or it may be located in a different spare orbit 53 (FIG. 4). If a spare satellite is not available, task 715 loops to task 735 to determine if a replacement satellite should be launched.

When tasks 706 and 707 determine that neither a hard failure or a soft failure has occurred. If so, task 715 is performed which determines if a spare is available.

When a spare satellite is available, task 720 determines if the spare satellite is to placed in service. If spare satellite is not to be placed in service, task 720 loops back to task 705. If a spare satellite is to be placed in service, task 725 provides the spare satellite with a positional target, along with authorization to relocate to that position. In task 730, a spare satellite maneuvers to the target position.

Task 735 determines if a replacement satellite should be launched, if there is not a spare satellite as determined by task 715, or if a spare satellite is placed in service from spare orbit 53 (FIG. 4). If task 735 determines that a replacement satellite is not to be launched, task 735 loops back to task 705. If task 735 determines a replacement satellite should be launched, then task 740 ensures the launch of a minimum of two satellites. The number of satellites launched is dependent on the type of space vehicles employed by communication system 10 (FIG. 1). Different launch vehicles carry different payloads of satellites. For example, a Russian launch vehicle, Proton, carries seven satellites; a McDonnell Douglas Aerospace launch vehicle, Delta II, carries five satellites; and a Chinese launch vehicle, Long March 2C, carries two satellites. However, in the preferred embodiment, two is the minimum number of satellites carried at this time. One skilled in the art knows that one satellite may be launched if desired. For clarity of this discussion, two satellites are launched.

Satellites launched in task 740 are delivered in task 745 to parking orbit 52 (FIG. 4). Task 750 commands both satellites located in parking orbit 52 (FIG. 4) to maneuver to spare orbit 53 (FIG. 4). Maneuver procedures utilizing firing of thrusters and/or drifting are discussed above.

Task 755 determines if both satellites remain in spare orbit 53 (FIG. 4) of that orbital plane 14 (FIG. 1) or if one or both satellites should be moved to a higher orbit in the same plane or to another plane 14 (FIG. 1). If task 755 determines that both satellites should remain in spare orbit 53 (FIG. 4) of that orbital plane 14 (FIG. 1), procedure 700 loops back to task 705. If task 755 determines that at least one satellite should be moved to a different location, task 760 commands the satellite to initiate maneuver procedures.

Maneuvering may be conducted by firing thrusters or by allowing the satellite to drift or by using a combination of both thrusters and drifting. The new target location may be an orbit for example operational orbit 54 or monitor orbit 55 in the same plane. The new target location may be a different orbital plane. For example, a satellite in spare orbit 53 (FIG. 4) may be re-located to spare orbit 53 (FIG. 4).

Task 765 monitors a satellite-until it reaches its destination in a spare orbit 53 (FIG. 1) of a different plane 14 (FIG. 1). Task 770 periodically checks if the maneuvering satellite has reached its destination. If the satellite has not reached its destination, task 765 continues monitoring the satellite's movement. If task 770 determines the satellite has reached its destination, task 775 commands the satellite to halt drift. When the satellite is stabilized in destination spare orbit 53 (FIG. 4), task 775 loops back to task 705.

What is claimed is:

1. A method of replacing a failing satellite in a constellation of orbiting satellites that are moving rapidly with respect to earth's surface, each satellite of said constellation residing in one of several orbital planes, each of said several orbital planes having a spare orbit and an operational orbit associated therewith, said operational orbit having satellites that support communication services, said orbiting satellites within said several orbital planes communicate with each other over in-plane cross-links, said orbiting satellites of adjacent of said several orbital planes communicate with each other over cross-plane cross-links, said method comprising steps of:

providing for at least one of said several orbital planes, an orbiting spare satellite located in said spare orbit;

detecting said failing satellite in said operational orbit; and commanding said orbiting spare satellite to replace said failing satellite, shutting off one in-plane cross-links and one cross-plane cross-links of each satellite communicating with said failing satellite;

moving said orbiting spare satellite into a position previously occupied by said failing satellite; and turning back on said in-plane cross-links and cross-plane cross-links.

2. A method as claimed in claim 1 further comprising the steps of:

commanding said failing satellite to a monitor orbit;

comparing an operational condition associated with said failing satellite with an operational condition associated with said orbiting spare satellite; and commanding said failing satellite and said orbiting spare satellite to exchange positions when said operational condition associated with said orbiting spare satellite is better than said operational condition of said failing satellite.

3. A method as claimed in claim 1 wherein the commanding step further comprises the step of exchanging positions of said failing satellite in said operational orbit with a position of said orbiting spare satellite in said spare orbit.

4. A method of replacing a failing satellite in a constellation of orbiting satellites that are moving rapidly with respect to earth's surface, each satellite of said constellation residing in one of several orbital planes, each of said several orbital planes having a spare orbit and an operational orbit associated therewith, said operational orbit having satellites that support communication services, the method comprising the steps of:

providing for at least one of said several orbital planes, an orbiting spare satellite located in said spare orbit;

detecting said failing satellite in said operational orbit; and comparing an operational condition associated with said failing satellite with an operational condition associated with said orbiting spare satellite; and commanding said failing satellite and said orbiting spare satellite to exchange positions when said operational condition associated with said orbiting spare satellite is better than said operational condition of said failing satellite.

5. A method as claimed in claim 4 wherein the comparing and commanding steps, the failing satellite is a second failing satellite and the orbiting spare satellite is a second orbiting spare satellite, and wherein prior to the comparing and commanding steps, the method includes the steps of:

exchanging positions of a first orbiting spare satellite and a first failing satellite when an operational condition of said first orbiting spare satellite is better than an operational condition of said first failing satellite, said first failing satellite becoming said second orbiting spare satellite after the exchanging step.

6. A method as claimed in claim 2 further comprising the step of commanding said orbiting spare satellite to relocate from said at least one of said several orbital planes to a second spare orbit of a different of said several orbital planes.

7. A method as claimed in claim 1 wherein said orbiting satellites within said at least one of said several orbital planes communicate with each other over in-plane cross-links, wherein said orbiting satellites of adjacent of said several orbital planes communicate with each other over cross-plane cross-links, and wherein the commanding step further comprises the steps of:

shutting off each of said in-plane cross-links and said cross-plane cross-links of satellites communicating with said failing satellite;

moving said orbiting spare satellite into a position previously occupied by said failing satellite; and turning back on said in-plane cross-links and cross-plane cross-links.

8. A method as claimed in claim 7 further comprising the step of commanding said failing satellite to a monitor orbit that is at a higher altitude than said operational orbit, said monitor orbit having an inclination angle slightly less than said inclination angle of said operational orbit.

9. A method as claimed in claim 8 wherein said each satellite in said constellation has an operational condition associated therewith, and the method further comprises the steps of:

said failing satellite traveling at a different velocity in said monitor orbit than said operational orbit, wherein said failing satellite passes said satellites in said operational orbit during different orbital positions of said monitor orbit;

comparing said operational condition associated with said failing satellite in said monitor orbit with said operational condition associated with a nearby satellite of said satellites in said operational orbit; and commanding said failing satellite to exchange positions with said nearby satellite when said operational condition associated with said failing satellite is better than said operational condition associated with said nearby satellite, wherein the comparing step and the commanding to exchange step are performed during when said failing satellite passes said nearby satellite.

10. A method of replacing a failing satellite in a constellation of satellites that are moving rapidly with respect to earth's surface, each satellite of said constellation in one of several orbital planes, said orbiting satellites within said several orbital planes communicate with each other over in-plane cross-links, said orbiting satellites of adjacent of said several orbital planes communicate with each other over cross-plane cross-links, said method comprising steps of:

providing, for at least one of said several orbital planes, an orbiting monitor satellite located in a monitor orbit, wherein said orbiting monitor satellite remains within said monitor orbit of said one orbital plane traveling at a different orbital velocity than other satellites in said at least one of said several orbital planes, said other satellites being in an operational orbit;

detecting said failing satellite in said operational orbit;

positioning said orbiting monitor satellite in said operational orbit near said failing satellite; and operating said orbiting monitor satellite in place of said failing satellite by turning off said in-plane cross-links and cross-plane cross-links of said failing satellite and turning on said in-plane cross-links and cross-plane cross-links of said orbiting monitor satellite, wherein the detecting step includes the step of comparing an operational condition of the failing satellite with said orbiting monitor satellite, and wherein the positioning and operating steps are performed when the operational condition of the orbiting monitor satellite is better than the operation condition of the failing satellite.

11. A method as claimed in claim 10 further comprising the steps of:

detecting a second failing satellite in said operational orbit;

changing an altitude and an inclination angle of said failing satellite;

moving said failing satellite to a position nearby said second failing satellite;

returning said failing satellite to an altitude and inclination angle of said operational orbit; and operating said failing satellite in place of said second failing satellite, wherein the detecting steps and the changing, moving, returning and operating steps are performed until an overall operational condition of said one of said several orbital planes is maximized.

12. A method as claimed in claim 11 wherein the monitor orbit is at a slightly higher altitude than said operational orbit, said method further comprising the step of exchanging positions of said failing satellite with a position of said orbiting monitor satellite, wherein the exchanging step comprises the steps of:

approaching said failing satellite by said orbiting monitor satellite;

decreasing altitude of said orbiting monitor satellite to said operational orbit; and increasing altitude of said failing satellite to said monitor orbit.

13. A method as claimed in claim 12 wherein said failing satellite and said satellites in said one of several orbital planes have an operational condition associated therewith, and wherein the method further comprising the steps of:

comparing said operational condition of each of said satellites in said one of several orbital planes with an operational condition of said orbiting monitor satellite; and replacing one of said satellites in said one of several orbital planes when said operational condition of said one satellite is worse than said operational condition of said orbiting monitor satellite.

14. A method as claimed in claim 13 wherein said inclination angle of said several orbital planes is between eighty and ninety degrees with respect to earth's equator, and wherein the monitor orbit is higher than said operational orbit and has an inclination angle less than said inclination angle of said operational orbit.

15. A method as claimed in claim 14 wherein said orbiting satellites within said at least one of said several orbital planes communicate with each other over in-plane cross-links, wherein said orbiting satellites of adjacent of said several orbital planes communicate with each other over cross-plane cross-links, and wherein the replacing step further comprises the steps of:

shutting off each of said in-plane cross-links and said cross-plane cross-links of satellites communicating with said failing satellite;

moving said orbiting monitor satellite into said position previously occupied by said failing satellite; and turning back on said in-plane cross-links and cross-plane cross-links.

16. A communication system that replaces a failing satellite comprising:

a constellation of orbiting satellites that are moving rapidly with respect to earth's surface, each satellite of said constellation residing in one of several orbital planes, each of said several orbital planes having a spare orbit and an operational orbit associated therewith, said operational orbit having satellites that support communication services, each of said several orbital planes having an inclination angle with respect to earth's equator;

an orbiting spare satellite located in said spare orbit for at least one of said several orbital planes, said spare orbit being at a lower altitude and at a different inclination angle than said operational orbit, said orbiting spare satellite travels at a different orbital velocity than satellites of said operational orbit; and a control center for detecting said failing satellite in said operational orbit, for commanding said orbiting spare satellite to replace said failing satellite when an operational condition associated with said orbiting spare satellite is better than an operational condition of said failing satellite, wherein said inclination angle of said operational orbit is between eighty and ninety degrees with respect to earth's equator, and said different inclination angle is slightly less than said inclination angle of said operational orbit, and wherein said orbiting satellites within said at least one of said several orbital planes communicate with each other over in-plane cross-links, wherein said orbiting satellites of adjacent of said several orbital planes communicate with each other over cross-plane cross-links, wherein the control center commands satellites communicating with said failing satellite to shut off each of said in-plane cross-links and said cross-plane cross-links, the control center commands said orbiting spare satellite to move into a position previously occupied by said failing satellite, and the control center commands said in-plane cross-links and cross-plane cross-links to turning back on.

17. A communication system as claimed in claim 16 wherein said each satellite in said constellation has an operational condition associated therewith, and wherein said failing satellite travels at a different velocity in said spare orbit than said operational orbit, wherein said failing satellite passes said satellites in said operational orbit during different orbital positions of said spare orbit, and wherein said control center:

includes means for comparing said operational condition associated with said failing satellite in said spare orbit with said operational condition associated with a nearby satellite of said satellites in said operational orbit; and includes means for commanding said failing satellite to exchange positions with said nearby satellite when said operational condition associated with said failing satellite is better than said operational condition associated with said nearby satellite when said failing satellite passes said nearby satellite.

* * * * *